Feb. 6, 1968 K. ZIEGLER 3,367,007

CUTTING TOOL HOLDER

Filed Nov. 22, 1965 3 Sheets-Sheet 1

Inventor
Karl Ziegler
By Stevens Davis Miller + Mosher
Attorneys

United States Patent Office 3,367,007
Patented Feb. 6, 1968

3,367,007
CUTTING TOOL HOLDER
Karl Ziegler, Balwyn, Victoria, Australia, assignor to Zenford Proprietary Limited, Preston, Victoria, Australia
Filed Nov. 22, 1965, Ser. No. 508,995
Claims priority, application Australia, Dec. 1, 1964, 52,319/64
5 Claims. (Cl. 29—105)

ABSTRACT OF THE DISCLOSURE

A cutting tool holder having a recess formed in the outer cylindrical surface thereof and a pair of slots formed therethrough, one of said slots terminating at said recess, and a jaw member disposed between the slots and defining together with a corresponding opposed surface of said recess a pair of clamping surfaces for the tool. Means are provided for adjusting the position of the jaw member relative to the body member and a fulcrum member projects into the other of said slots so as to engage the adjacent side surface of the jaw member to move same into clamping engagement with the tool upon actuation of the adjusting means.

---

This invention relates to cutting tool holders of the kind having, a body portion, one or more recesses within said body portion, each recess being adapted to receive a cutting tool insert so that a cutting edge of the insert is exposed for engagement with a workpiece, and clamping means for removably securing the or each insert within its respective recess. For convenience, such cutting tool holders will be hereinafter referred to as cutting tool holders of the kind indicated.

The clamping means for such cutting tool holders generally includes a removable wedge shaped member which is located at one side of the recess and is held in position by one or more clamping screws. Since the wedge member is a separate integer from the main body of the holder, the recess and associated wedge member must be accurately machined for co-operative engagement thereby rendering the holder relatively expensive because of the amount of machining required and the material used. Also, the use of separate wedge members complicates the construction and use of the holder.

It is a primary object of the present invention to provide a tool holder of the kind indicated in which the clamping means includes a jaw member which is an integral part of the main body of the holder, and which therefore simplifies the construction and also the use of the holder.

In order that the invention will be readily understood, preferred practical embodiments thereof will be hereinafter described in relation to the accompanying drawings, in which.

Figure 1:
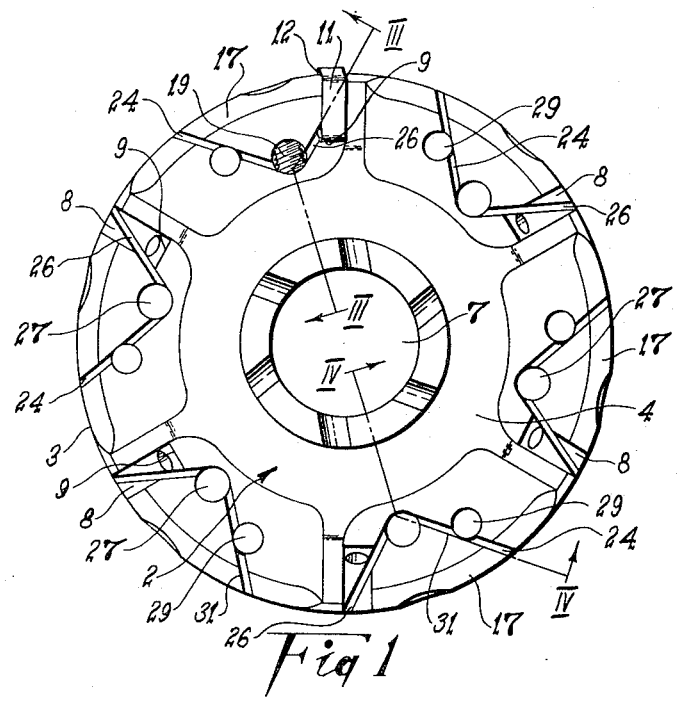
FIGURE 1 is a front elevational view of one particular embodiment having a plurality of recesses but showing an insert in one recess only for convenience of illustration.
Figure 2:
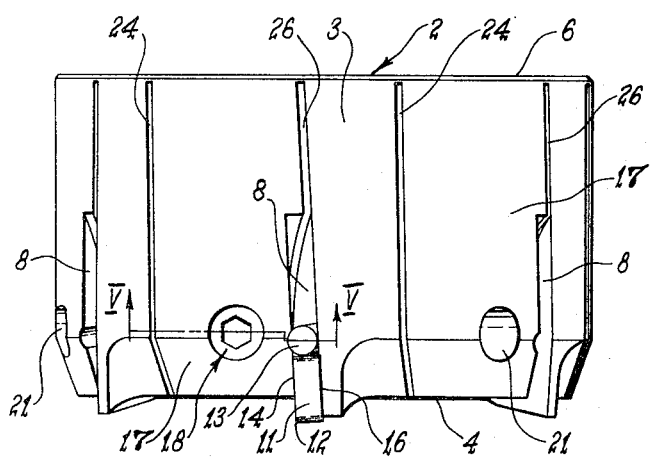
FIGURE 2 is a side elevational view of the holder illustrated in FIGURE 1.

The description which follows mentions essential and optional features of the invention and refers to the drawings for the purpose of illustrating these features in a preferred form.

A cutting tool holder according to the present invention is adapted for use with cutting tool inserts of the kind comprising a substantially flat piece of metal, such as carbide or carboloy for example. Each insert has a pair of opposite and substantially parallel faces, and at least one cutting edge. In one form, for example, the faces are substantially square and cutting edges are provided along each side of the faces.

For convenience in describing the invention more fully, two practical embodiments thereof will hereinafter be described; but it is to be understood that those embodiments are described by way of example only.

According to the first example illustrated in FIGURES 1 to 5, the invention is applied to a disc type tool holder of the kind used for milling cutters. Such holders generally include a cylindrical disc shaped body portion 2 having an outer peripheral surface 3 and front and back end faces 4 and 6 respectively. An axial bore 7 extends through the disc from one end face thereof to the other for mounting the holder on a milling machine arbor (not shown).

In the present example, a plurality of recesses 8 are formed around the outer periphery of the disc. Each recess 8 is formed in both the front end face 4 and the outer peripheral surface 3 so as to have a base 9 for engagement by one edge of a cutting tool insert 11. Preferably, the depth of the recess 8 is such that the insert 11 is supported on the base 9 so that a cutting edge 12 thereof is exposed for engagement with a workpiece (not shown), and the distance between the side surfaces of the recess 8 is normally slightly greater than that between the opposite faces of the insert 11.

A suitable stop such as a pin 13 or an end wall, for example, may also be provided within each recess 8 so as to locate the respective insert 11 with one edge projecting beyond the front end face 4 of the disc. In FIGURE 1 of the drawings, the pin 13 has been omitted from all recesses 8 with the exception of that shown containing an insert 11, for convenience of illustration.

The opposite side surfaces of each recess 8 are preferably substantially parallel and at least part of those side surfaces form clamping surfaces 14 and 16 respectively, each of which is adapted to engage a separate face of an insert 11.

A separate clamping means is provided for each recess 8 and includes a jaw member 17 formed integrally with the main body portion 2 and arranged for movement relative to the remainder of the body portion 2. Preferably, the jaw member 17 is formed by partly severing a portion of the body from the remainder thereof.

The partly severed portion or jaw member 17 has the clamping surface 14 formed thereon, and the connection between each jaw member 17 and the remainder of the body portion 2 is of such dimensions as to be resilient whereby the clamping surface 14 on each jaw member 17 can be moved towards or away from the other clamping surface 16 of the associated recess 8.

Displacing means such as a retaining screw 18, for example, is provided for releasably holding each jaw member 17 in a clamping position—that is, in a position such as to hold a cutting tool insert 11 securely within the recess 8. Such a screw preferably includes, a shank 19 which is freely located within an aperture 21 passing through the jaw member 17, and a head portion 22 at one end of the shank 19 for engaging a shoulder 20 within the aperture 21 of the jaw member 17. The shank 19 is screw threaded for threadably engaging within a complementary screw threaded hole 23 in the main body portion 2 of the tool holder.

The retaining screw aperture 21 preferably extends through the jaw member 17 from the outer peripheral surface of the disc substantially transverse to the rotational axis thereof, and is preferably located adjacent the recess 8, or adjacent that portion of the recess which receives the insert 11. The aperture 21 is counterbored or counter-recessed to receive the head portion 22 of the retaining screw 18 and to form the shoulder 20 against which the head portion 22 may engage. The screw threaded hole 23 formed in the body 2 of the disc is, of course, in axial alignment with the aperture 21 so as to receive the threaded shank 19 of the retaining screw 18.

The jaw member 17 of each recess 8 is preferably defined between two slots 24 and 26 formed through the outer surface 3 and converging to a junction beyond the base 9 of the recess 8. The slots 24 and 26 extend lengthwise of the body portion 2 from the front face 4 towards the rear face 6 so as to form between them a substantially sector shaped jaw member in transverse cross-section.

Figure 3:
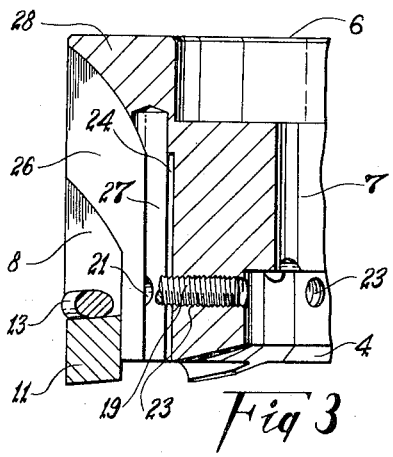
FIGURE 3 is a cross-sectional view taken along line III—III of FIGURE 1.
Figure 4:
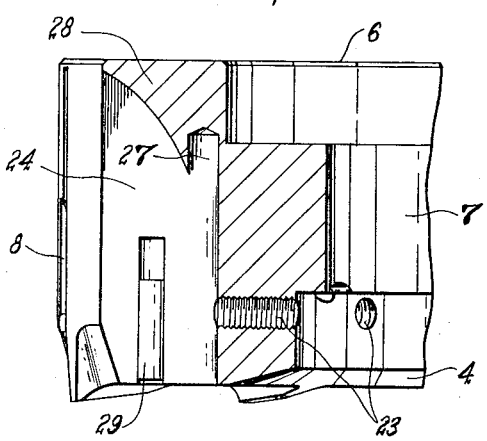
FIGURE 4 is a cross-sectional view taken along line IV—IV of FIGURE 1.
Figure 5:
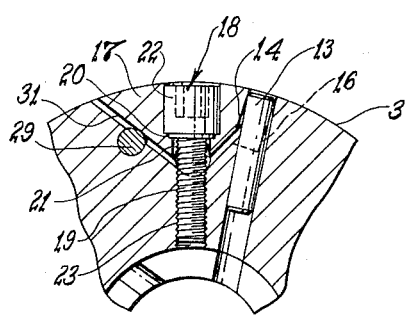
FIGURE 5 is a cross-sectional view taken along line V—V of FIGURE 2.

In the embodiment illustrated, both slots 24 and 26 terminate adjacent the rear face 6 of the body portion as shown in FIGURES 3 and 4 of the drawings. However, one slot, preferably slot 26, may extend completely through the end faces 4 and 6 if desired.

The junction or communication of the slots may be obtained through a bore 27 extending from the front end face 4 of the disc in the same general direction as the rotational axis of the disc, and terminating at or adjacent the terminal ends of the slots 24 and 26.

The jaw member 17 defined by the slots 24 and 26 is connected to the main body portion of the disc through the portion of material 28 remaining between the terminal ends of the slots and the rear end face 6 of the disc. The disc is made from a material such as steel, so that the connecting portion 28 is capable of some elastic deformation.

A fulcrum member may be provided between the opposed surfaces of each slot 24 at a position adjacent to the recess 8 or the portion thereof which receives the insert 11. Preferably, the fulcrum member consists of at least one dowel pin 29 extending from adjacent the front end face 4 of the body 2 and having part of its outer cylindrical surface projecting into the space between the opposed surfaces of the slot 24 so as to engage surface 31 of the jaw member 17.

In use, upon screwing the retaining screw 18 into its associated threaded hole 23 in the disc body 2, the head portion 22 of the screw eventually engages the shoulder 20 within the jaw member aperture 21. Further movement of the screw 18 in that direction causes the jaw member 17 to be drawn inwardly towards the rotational axis of the disc through elastic deformation of the connecting portion 28.

Because of the fulcrum 29 however, during such inward movement, the jaw member 17 is simultaneously moved in a direction such that the distance between the opposed clamping surfaces 14 and 16 progressively decreases. Consequently, a cutting tool insert 11 located within the recess 8 is firmly clamped in position.

It will be appreciated that the initial clearance between the faces of the insert 11 and the clamping surfaces 14 and 16 may be quite small, so that only a relatively small amount of movement of the jaw member 17 is required to effect clamping of the insert 11. Also, upon screwing the retaining screw 18 in a direction out of its associated screw threaded hole 23 in the body portion 2, the jaw member 17 will move away from the insert 11 because of the elasticity of the connecting portion 28. Thus, the insert 11 is released for removal from the cutting tool holder.

Figure 6:
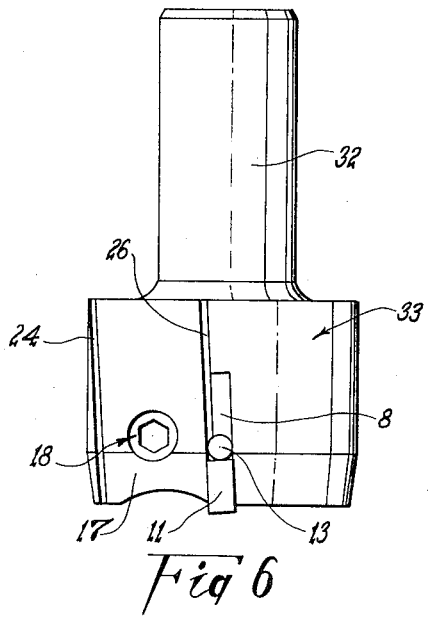
FIGURE 6 is a side elevational view of a second embodiment incorporating the present invention.
Figure 7:
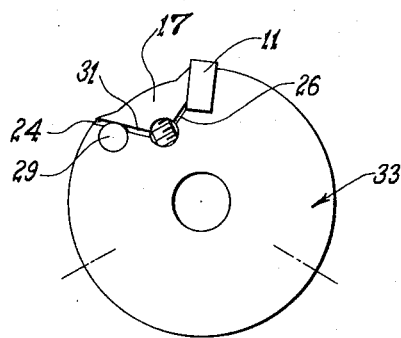
FIGURE 7 is an end view of the holder illustrated in FIGURE 6.

According to a second example, illustrated in FIGURES 6 and 7 of the drawings, the invention is applied to a tool holder of the kind used for end mill cutters.

Such end mill cutters generally include a shank portion 32 for drivably connecting the tool holder to a milling machine, and a head or body portion 33 which in the present case contains one or more recesses 8 and associated clamping means as described in connection with the previous example. The head portion 33 may be substantially cylindrical having the shank portion 32 extending from one end face so as to be in coaxial alignment therewith. The end face of the head portion remote from the shank is considered to be the front end face of the tool holder.

Three recesses 8 and associated clamping means may be provided on the illustrated example, but only one has been shown in detail for convenience of illustration.

It will be appreciated from the foregoing description that the invention results in a simplified cutting tool holder which is relatively inexpensive to manufacture.

Having now described my invention, what I claim as new and desire to secure by Letters Patent is:

1. A cutting tool holder comprising a cylindrical body portion, at least one recess formed within the cylindrical surface of said body portion and extending from a front end face thereof for receiving a cutting tool, at least one pair of slots formed through the cylindrical surface of the body portion and extending from the front face thereof, said slots converging from said cylindrical surface to a junction beyond the base of a corresponding recess with one of said slots terminating at said recess, a jaw member disposed between said slots, the opposed surfaces of said jaw member and said corresponding recess forming a pair of clamping surfaces for a tool, means for adjusting the position of said jaw member relative to said body portion, and a fulcrum member projecting into the other of said slots so as to engage the adjacent side surface of said jaw member to move same into clamping engagement with said tool.

2. The tool holder of claim 1, wherein said jaw member is integral with the body portion through a resilient connecting portion for permitting movement of the jaw member relative to the body portion, at least one of said slots terminating adjacent the rear end of said body portion to form said connecting portion between its terminal end and said rear end.

3. The tool holder of claim 1, wherein said adjusting means comprises a screw having a head engaging the jaw member and a screw threaded shank passing through an open ended hole in the jaw member for rotation relative thereto and threadably engaging within a complementary screw threaded hole in said body portion, said screw being arranged to adjust the position of said jaw member relative to said body portion so as to vary the distance between the clamping surfaces and hold the jaw member in the desired operative position.

4. The tool holder of claim 1, wherein said fulcrum member is in the form of a dowel pin extending from the front end face of said body portion and having a portion of its outer cylindrical surface projecting into said other of said slots.

5. The tool holder of claim 1, wherein said slots extend lengthwise of said body portion from the front face towards the rear face thereof and extend substantially parallel to each other in this direction.

References Cited

UNITED STATES PATENTS

| 2,814,854 | 12/1957 | Murray | 29—105 |
| 2,958,119 | 11/1960 | Stansfield | 29—105 |
| 3,123,896 | 3/1964 | Wilson | 29—105 |

FOREIGN PATENTS

| 20,795 | 2/1961 | Germany. |
| 1,362,568 | 4/1964 | France. |
| 1,143,082 | 1/1963 | Germany. |

HARRISON L. HINSON, *Primary Examiner.*